United States Patent [19]

Motose

[11] Patent Number: 5,715,793

[45] Date of Patent: Feb. 10, 1998

[54] ENGINE SPEED CONTROL SYSTEM

[75] Inventor: Hitoshi Motose, Hamamatsu, Japan

[73] Assignee: Sanshin Kogyo Kabushiki Kaisha, Japan

[21] Appl. No.: 741,496

[22] Filed: Oct. 31, 1996

[30] Foreign Application Priority Data

Oct. 31, 1995 [JP] Japan ................................ 7-283626

[51] Int. Cl.$^6$ ........................... F02P 5/15; F02D 41/04
[52] U.S. Cl. ........................ 123/417; 123/486; 123/488; 73/117.3
[58] Field of Search ................................... 123/417, 422, 123/423, 478, 480, 486, 488, 494; 73/117.3, 118.2

[56] References Cited

U.S. PATENT DOCUMENTS

| 4,702,214 | 10/1987 | Wataya | 123/488 |
|---|---|---|---|
| 4,928,654 | 5/1990 | Hosaka | 123/486 |
| 4,977,880 | 12/1990 | Bonfiglioli et al. | 123/488 |
| 5,184,589 | 2/1993 | Nonaka | 123/352 |
| 5,215,068 | 6/1993 | Kato | 123/488 |
| 5,555,870 | 9/1996 | Asano | 123/488 |
| 5,617,337 | 4/1997 | Eidler et al. | 123/479 |
| 5,626,120 | 5/1997 | Akasuka | 123/479 |

*Primary Examiner*—Willis R. Wolfe
*Attorney, Agent, or Firm*—Knobbe, Martens, Olson & Bear, LLP.

[57] ABSTRACT

An engine speed control system for an engine of the type having a throttle position sensor for outputting throttle position data, from which engine control parameters are determined, is disclosed. In accordance with this system, an output value of the throttle position sensor is obtained. If the output value is within a predetermined range, an adjustment value is calculated. If the adjustment value is within a predetermined range, a new throttle position value is calculated based on the output value of the throttle position sensor as adjusted by the adjustment value. Engine control parameters, such as timing and fuel injection volume, are then determined based on the adjusted throttle position value.

13 Claims, 4 Drawing Sheets

ENGINE SPEED CONTROL SYSTEM

FIELD OF THE INVENTION

The present invention relates to an engine speed control system, and more particularly to such a system in which fuel injection volume and ignition timing are determined indirectly from throttle valve position.

BACKGROUND OF THE INVENTION

Engine control systems utilize data received from one or more sensors for use in setting engine control parameters. One set of data which is often useful in determining the proper engine control parameters is air intake volume to the engine. In some engines, the air intake volume is determined directly by a measuring device. One significant drawback to these types of devices is that when they are exposed to salty air or other corrosive forces, the sensors have low durability and often malfunction. This may occur when the device is used, for example, in conjunction with an engine utilized to power the outboard motor of a boat.

Because of the problems associated with utilizing direct air intake volume sensors in these engine applications, the intake air volume is normally determined indirectly from data received from another sensor. For example, a throttle position sensor may provide throttle valve position data to the engine control, from which air intake volume is extrapolated.

This method of determining intake air volume, however, suffer from inaccuracies. First, the air flow volume is calculated indirectly from the throttle position data. In addition, the throttle position data has an error associated therewith resulting from the fact that the throttle position sensor can not, with perfect accuracy, measure the throttle position.

In these systems, the engine control system controls ignition timing and/or fuel injection volume based on engine speed data and a three-dimensional map of intake air volume as related to measure throttle valve opening angle. Therefore, if incorrect throttle valve opening data is received by the engine control, incorrect ignition timing and fuel injection volume are obtained, as compared to the optimum timing and injections volume for the true engine operational conditions. Thus, when the ignition timing and injection volume are incorrect, the engine operates at other than optimum performance. This is especially true when the throttle angle opening is small and the engine is idling. In this condition small variations from the correct engine timing or injection volume may cause the engine speed to fluctuate and the engine to run rough.

It is, therefore, an object of the present invention to provide an engine control for controlling engine operational parameters such as fuel injection volume and ignition timing. A further object of the present invention is to provide an engine control by which errors corresponding to the throttle valve opening detection apparatus are compensated for. A still further object of the present invention is to provide an engine control which calculates fuel injection volume and timing by indirectly calculating intake air volume from corrected throttle opening dam.

SUMMARY OF THE INVENTION

In accordance with the present invention, there is provided an engine speed control system and method. The engine control is useful with an engine of the type in which intake air volume is determined indirectly from the position of a throttle valve of the engine.

The engine speed control system includes means for determining if an adjustment to the throttle position data should be accomplished; means for providing an adjustment value when prompted by said means for determining if an adjustment to the throttle position data should be accomplished; means for providing adjusted throttle position data based on said adjustment value; and means for determining one or more engine control parameters from said adjusted throttle position data.

In accordance with the method of the present invention, a throttle position value is obtained from the throttle position sensor. If the position value is within a predetermined range, an adjustment value is calculated. If this adjustment value is within a predetermined range, an adjusted throttle position value comprising the throttle position value adjusted by said adjusted value is calculated. From this adjusted throttle position value, engine control parameters, such as fuel injection volume and ignition timing, may be obtained from a map providing engine control data related to throttle position.

Further objects, features, and advantages of the present invention over the prior art will become apparent from the detailed description of the drawings which follows, when considered with the attached figures.

DETAILED DESCRIPTION OF THE PREFERRED EMBODIMENT

Figure 1:
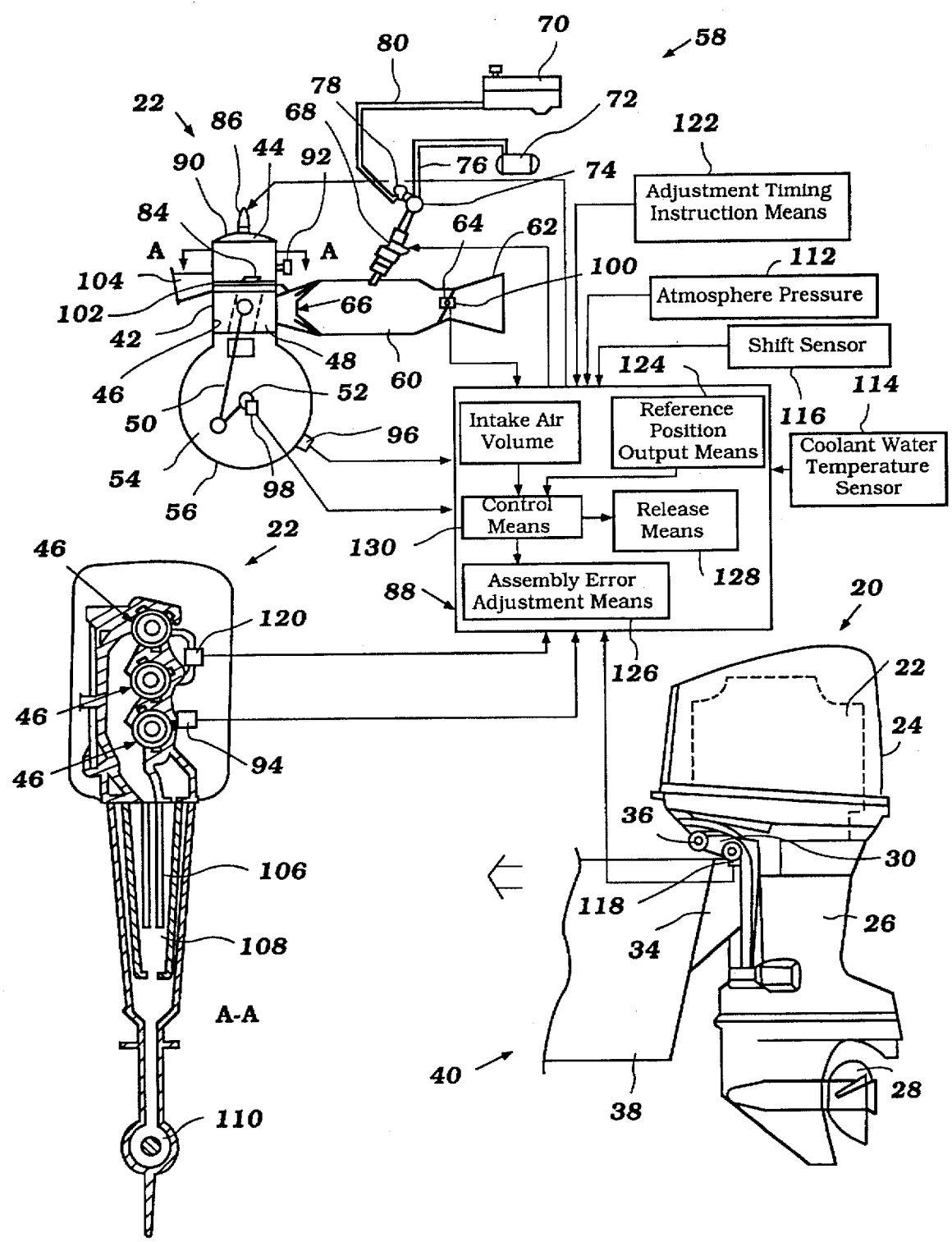
FIG. 1 is a composite view illustrating, at the bottom, right-hand side, a partial side elevational view of an outboard motor and accompanying watercraft to which it is attached and which is constructed and operated in accordance with an embodiment of the present invention; at the lower, left-hand side is a cross-sectional view taken generally along line A—A of the remaining view; and the remaining upper view is a partially schematic cross-sectional view taken through a single cylinder of the engine showing the components associated with the engine speed control system.

FIG. 1 illustrates an outboard motor 20 which is powered by an engine 22 operated in accordance with an embodiment of the present invention. The present invention is described with particularity with respect to an engine 22 for an outboard motor 20 as it has particular application thereto. Namely, engines of the type utilized in these applications are not well-suited to using direct intake air volume sensors and as such the intake air volume must normally be determined indirectly from throttle valve position. It will be readily apparent to one skilled in the art, however, that the invention can be applied to a wide variety of engines and engine applications where intake air volume is determined indirectly from throttle valve position.

The outboard motor 20 comprises a cowling 24 for containing the engine 22. The outboard motor 20 has a lower unit assembly 26. The engine 22 powers a propulsion unit, preferably a propeller 28, of the outboard motor 20.

The outboard motor 20 is mounted to the transom 38 of a watercraft 40. In particular, the outboard motor 20 includes a swivel bracket 30 that is pivotally connected to a mounting plate 34. The pivotal movement of the swivel bracket 30 relative to the mounting plate 34 is about a pivot axis defined by a pivot pin 36. In addition, the mounting plate 34 is adapted to be moved vertically relative to the hull so as to change the height of the propeller 28 in the body of water in which the watercraft is operating.

The engine 22 is preferably of the three-cylinder, in-line variety. The engine 22 operates on a two-stroke, crankcase compression principle. Although this type of engine is illustrated and described herein, it will be readily apparent to those skilled in the art how the invention may be practiced with engines having other cylinder numbers and configurations and also with engines operating on a four-cycle principle.

The engine 22 is comprised of a cylinder block 42 having a cylinder head 44 affixed thereto. The cylinder block 42 is formed with three horizontally-extending, vertically-spaced cylinder bores 46. Pistons 48 reciprocate in each of the cylinder bores 46. Each piston 48 is connected to an end of a connecting rod 50. The opposite end of each connecting rod 50 is journalled on the throws of a crankshaft 28 in a well known manner.

The crankshaft 52 rotates in a crankcase chamber 54 that is formed by a crankcase member 56 that is affixed to the cylinder block 42 and, in part, by the skirt of the cylinder block. As is typical with two-cycle crankcase compression engines, the crankcase chamber is actually divided up into a number of chambers, one each associated with each of the cylinder bores 46, with the chambers sealed one from the other.

An induction and charge-forming system, indicated generally by the reference numeral 58 is provided for supplying a fuel/air charge to the crankcase chambers 54. Although the invention is described in conjunction with a specific type of fuel/air charging system, it will also be readily apparent to those of skill in the art how the invention may be utilized with various other types of fuel and air charging systems.

The air and fuel charging system 54 includes an intake manifold 60 that receives atmospheric air at an air inlet 62 in which a throttle valve 64 is positioned.

The intake manifold 60 discharges into the crankcase chambers 54 through an intake port in which a reed-type check valve 66 is positioned. The reed-type check valve 66 functions to permit the air and fuel to flow into the crankcase chambers 54 when the pistons 48 are moving upwardly in their cylinder bores 46. As the pistons 48 move downwardly to compress the charge in the crankcase chambers 54, these reed-type check valves 66 close to preclude reverse flow.

The air/fuel charging system 58 also includes a fuel injection system of the manifold type. This fuel injection system includes a fuel injector 68 which is electronically operated and which sprays fuel into the intake passage of the manifold 60 upstream of the reed-type check valve 66.

Fuel is supplied to the fuel injectors 68 by a fuel supply system that includes a remotely positioned fuel tank 70. Fuel is dram from the fuel tank 70 through a conduit by means that include a high pressure fuel pump 72 which, in turn, delivers the fuel to a fuel rail 74 through a supply conduit 76. The pressure of the fuel in the fuel rail 74 is controlled by a pressure-responsive valve 78. Pressure is controlled by dumping excess fuel back into the fuel system, for example, to the fuel tank 70 through a return conduit 80.

The fuel/air charge which is compressed in the crankcase chambers 54 is transferred to combustion chambers 82 formed by the cylinder bore 46, heads of the pistons 48 and cylinder head 44 through one or more scavenge passages 84. This charge which has been thus transferred is then fired by means of a spark plug 86 mounted in the cylinder head 44. There is, of course, one spark plug 86 for each cylinder bore 46.

The spark plugs 86 are fired by a suitable ignition system which is triggered and fired under the control of an ECU, indicated generally by the reference numeral 88 in accordance with a strategy which will be described.

In order to control not only the firing of the spark plugs 86 but also the air/fuel ratio by controlling the amount of fuel injected by the injector 68, the ECU 88 receives control signals from a wide variety of sensors of both engine and ambient conditions. These sensors include an in-cylinder pressure sensor 90 that is mounted in the cylinder head 44 and which outputs its signal to the ECU 88 through a suitable conductor indicated schematically in FIG. 1. This is the case with all other sensors and, therefore, the specific manner of connection of those sensors to the ECU 88 will not be described in particular detail.

The sensors further include a knock sensor 92. A cylinder temperature signal is provided by a temperature sensor 94 that senses the temperature in one of the cylinders. There is also provided a crankcase pressure sensor 96 and a crank angle position sensor 98. The signal from the crank angle sensor 98 is also utilized in the spark timing control, injection timing control and other controls. This also provides an indication of engine speed by measuring the pulses in a given time period.

A throttle valve position sensor 100 provides an indication of the operator demand or load on the engine 22, and also the intake air volume, by determining the position of the throttle valve 64. As disclosed below, this sensor 100 provides a signal in the form of an output voltage, with the output voltage relating to the position of the throttle valve (see FIG. 2).

The exhaust gases which are generated by the combustion in the combustion chamber are discharged from the combustion chamber through exhaust ports 102. These exhaust ports 102 all communicate with an exhaust manifold 104 that is formed, in part, integrally within the cylinder block 42 and which extends downwardly. As is typical with outboard motor practice, this exhaust manifold 104 communicates with an exhaust pipe 106 that depends into an expansion chamber 108 formed internally within the lower unit assembly 26 of the outboard motor 20. A through-the-propeller underwater exhaust gas discharge 110 discharges the exhaust gases to the atmosphere through the body of water in which the watercraft is operating under normal high-speed engine running conditions.

In addition to the engine operating conditions as noted, certain ambient conditions are also important in the control for the engine systems. Hence, atmospheric pressure signals are transmitted from a suitable sensor to the ECU 88. In addition, the temperature of the water in which the outboard motor 20 is operating and which is dram in for engine cooling is measured by a suitable sensor 114. This signal is also transmitted to the ECU 88.

The condition of the transmission that connects the engine 22 to the propeller 28 is also important, and as such, a shift sensor 116 outputs a signal to the ECU 88 for detecting and indicating this condition.

The trim angle also is important because its angle affects, among other things, the back pressure existent at the underwater exhaust discharge 110. Hence, a trim angle sensor 118 is provided at the swivel bracket 34, and it outputs its signal to the ECU 88.

In addition, an oxygen sensor 120 is supplied, preferably one for each cylinder.

Figure 2:
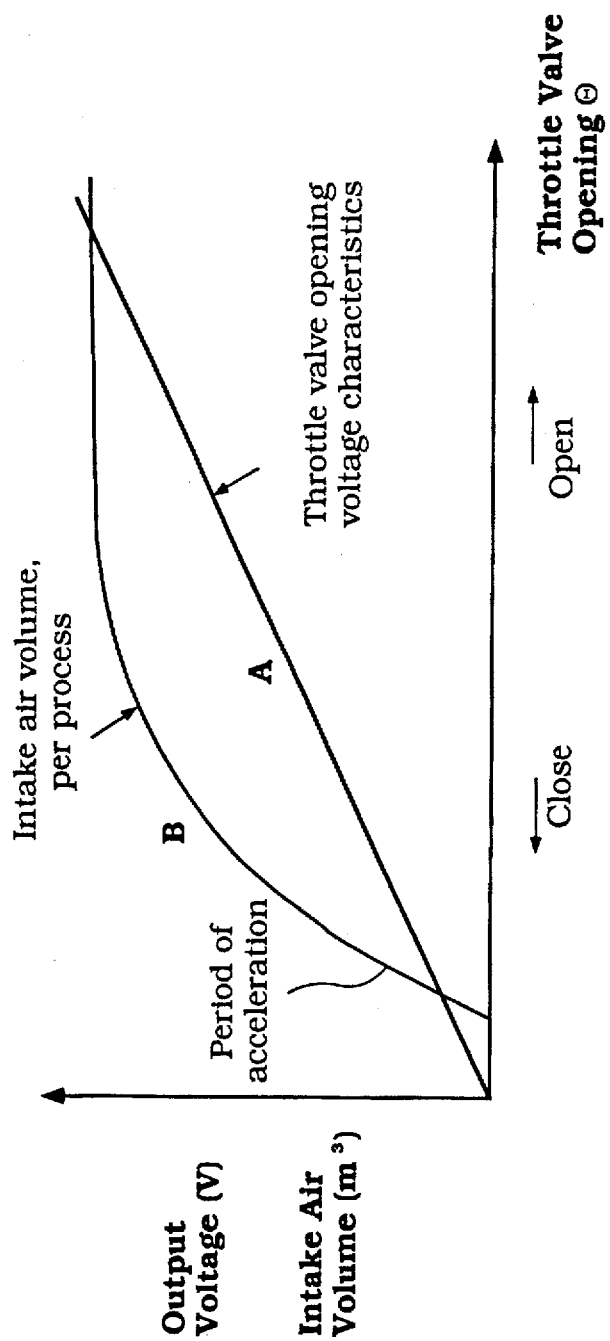
FIG. 2 is a graph illustrating the characteristics of output voltage of a throttle valve position sensor and of intake air volume, both with respect to throttle valve position.

FIG. 2 illustrates the characteristics of intake air volume and the output voltage of the throttle valve position sensor 100 as they relate to throttle valve opening. As illustrated therein by curve "A", the output voltage of the throttle valve position sensor 100 is generally proportional to the throttle valve opening. On the other hand, as illustrated by curve "B", intake air volume increases rapidly for changes in throttle valve opening angle when the throttle valve opening is small. Therefore, small errors in the perceived throttle opening greatly affect the determination of the actual intake air volume provided the engine 22.

Preferably, the engine 22 includes an engine control system and method in accordance with the present invention. This system includes a control mechanism 130 for use in controlling the various apparatus disclosed below. The system also includes an adjustment timing instruction means 122, a reference position output means 124, an assembly error adjusting means 126, and a compensation release means 128. The adjustment timing instruction means 122 provides instructions regarding when compensations for the assembly error of the throttle valve position sensor 100 should be made. The reference position output means 124 outputs a reference position of the throttle valve position sensor 100 when instructed to do so by the adjustment timing instruction means 122. The assembly error adjusting means 126 adjusts the assembly error based on the output from the reference position output means 124. The compensation release means 128 stores the compensation value or "assembly error". As described in more detail below, these means are utilized to generate an adjusted throttle position which may then be utilized to determine (from a map providing engine control data based upon throttle position) one or more engine control parameters, such as ignition timing and fuel injection data.

Preferably, the adjustment timing instruction means 122 utilizes a first input signal indicating a non-normal operational stage and a second signal from an outside source as a trigger to start the throttle position compensation sequence. Therefore, the compensation is initiated without interrupting the operational stage of the engine 22. The input signal indicating a non-normal operational stage is preferably received when multiple oil-level switches (not shown) are simultaneously operated. Similarly, the second input signal to the adjustment timing instruction means 122 is, for instance, the result of an executed instruction from an outside control. In this arrangement, a special structure does not have to be made for compensating the assembly errors, whereby the mutual members can be utilized for the compensating operation without affecting the operational stage of the engine 22.

The reference position output means 124 outputs the reference position of the throttle valve position sensor 100 when the throttle valve is completely closed. Therefore, there is no need to provide a special reference position output structure.

The assembly error adjusting means 126 compares the actual measured value of the reference position of the throttle valve position sensor 100 with a predetermined value (see FIG. 3 below, in which the throttle valve position sensor output is compared to a value of 0.5V), and the compared difference (i.e. the adjustment or compensation value) is stored by the compensation release means 128.

Figure 4A:
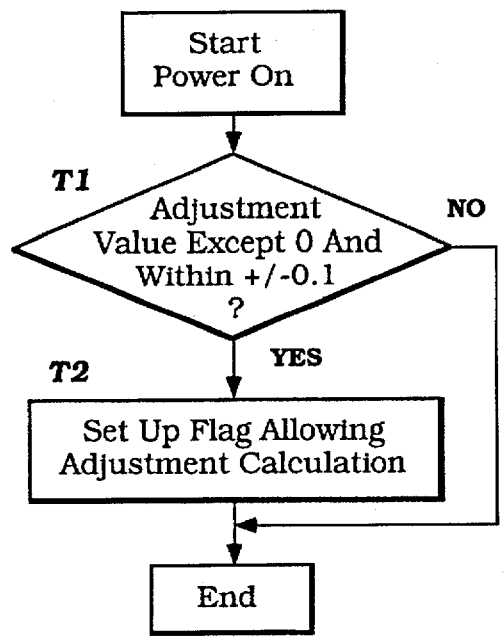
FIG. 4a is a flowchart illustrating the method sequence for determining whether an adjustment calculation should be permitted.

The assembly error adjusting means 126 avoids adjusting the assembly error accidentally by setting up the adjustment range within a predetermined range including a predetermined value which is added to the manufacturing assembly tolerance (see FIG. 4(a), in which this tolerance is ±0.1(V)). Based on the compared difference between the actual detected throttle position sensor output and the adjustment value, an adjusted throttle valve position is obtained.

The compensation of the throttle valve opening is performed before referencing the three dimensional map containing certain data such as the engine speed, throttle valve opening and ignition timing or injector driven time, or a two dimensional map containing the throttle valve opening and certain data, or at the time of actual measurement of the throttle valve opening.

Figure 3:
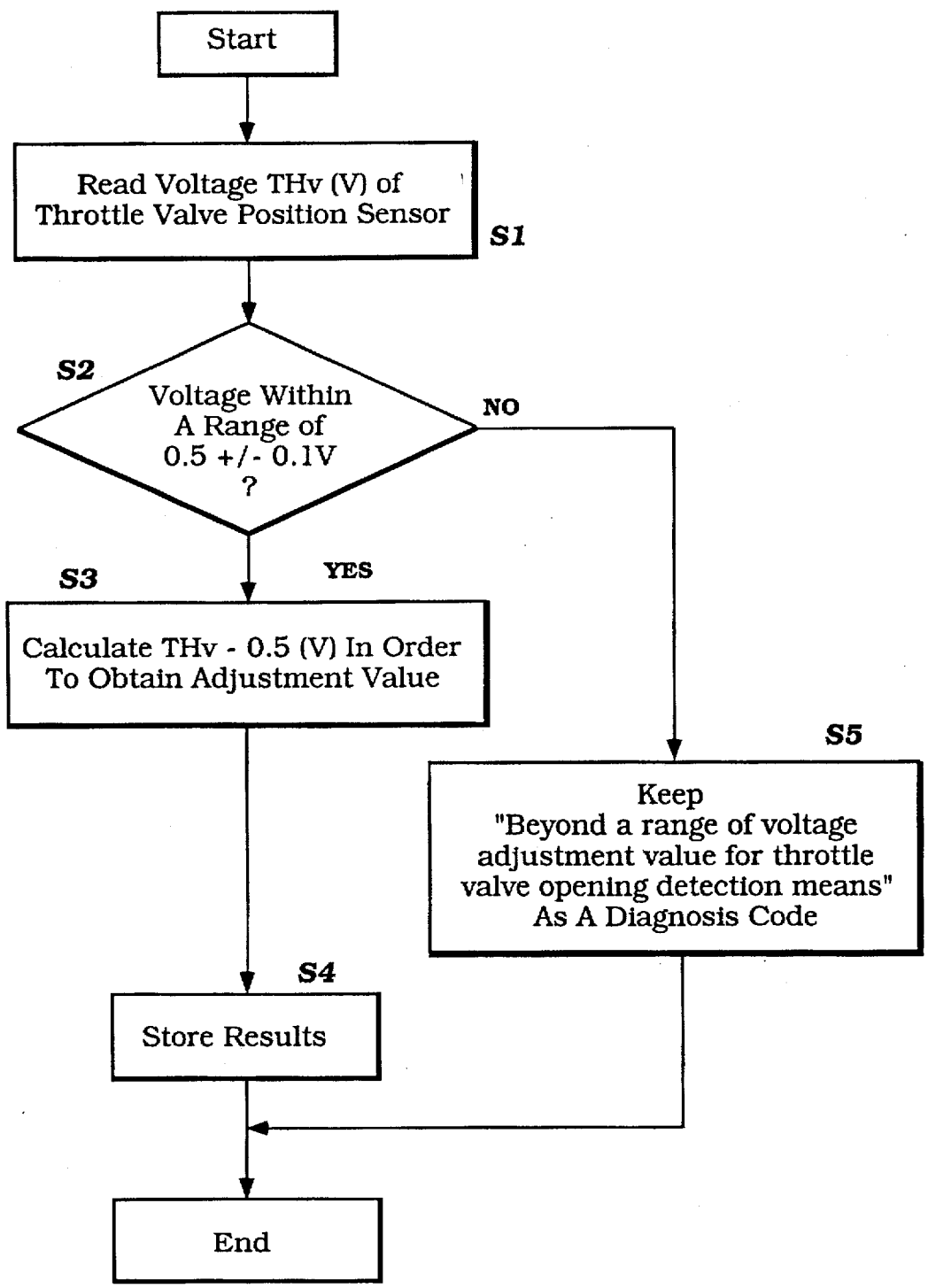
FIG. 3 is a flowchart illustrating the method sequence for determining whether an adjusted throttle valve sensor output should be calculated and, if so, an adjustment value.

Furthermore, the compensation release means 128 stores the adjustment or compensation value after the compensation sequence begins. Then, the compensation release means 128 ends the control by arranging either the throttle valve opening to be automatically compensated or, if it is determined that the compared difference of the throttle valve opening is outside the standard value, the sequence is ended. FIGS. 3 and 4 illustrate the preferred method of providing a compensated throttle position output and calculating the adjusted injection and/or ignition timing in accordance with the system of the present invention. The values provided herein are by way of illustration and may vary depending on the output levels, assembly errors and the like, as one skilled in the art will appreciate.

As illustrated in FIG. 3, at the start of the engine control method in step S1, the voltage value THv(V) of the throttle valve position sensor 100 is read. In step S2, if this voltage value THv(V) is within a range of 0.5±0.1(V), the voltage value THv(V)−0.5(V) is calculated in step S3 in order to calculate the compensation value. This result is stored, recorded and completed in step S4. If the voltage value THv(V) is outside a range of 0.5±0.1(V) in step S2, a diagnosis code indicating that it is not the proper time to initiate the adjustment or compensation sequence is recorded in step S5 and this step is ended.

In a compensation execution routine, as illustrated by the flowchart in FIG. 4(a), when the power is turned on, in step T1, it is determined whether or not the compensation value (calculated in the step-wise sequence corresponding to FIG. 3) is within ±0.1, excepting 0. If the compensation or adjustment value is within ±0.1, a flag indicating that compensation calculation is permitted is set in step T2 and the process is completed. If in step T1 the compensation value is not within ±0.1 except 0, the process is completed there.

Figure 4B:
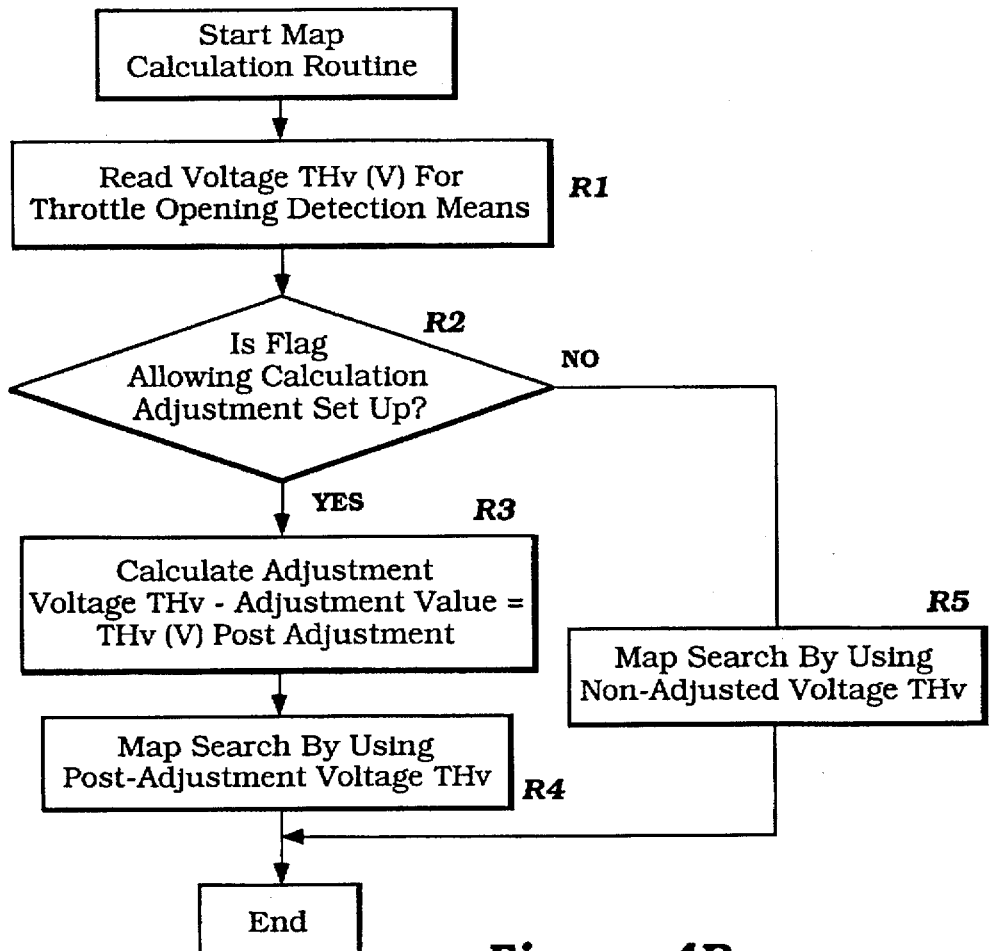
FIG. 4b is a flowchart illustrating the method sequence for map searching engine control parameters using the engine control of the present invention.

FIG. 4(b) illustrates the step of utilizing the throttle position output to search the map of engine control parameters for engine control parameters for controlling the engine 22. In the compensation execution routine in FIG. 4(b), the voltage value THv(V) is read in step R1 when the map calculation routine begins. In step R2, it is determined whether or not the flag indicating that compensation calculation is permitted is set up. If the flag is set up (which would occur in step T2, as illustrated in FIG. 4(a)), the compensation calculation is executed in step R3, whereby a compensation voltage value THv(V) is obtained by subtracting the compensated value from the voltage value THv(V). Then, in step R4, the map search is performed by using the compensation voltage value THv(V). If in step R2 it is determined that the flag indicating that compensation calculation is permitted is not set up, in step R5 the compensation is not performed and instead, the map search is performed by using the voltage value THv(V).

The system and method of the present invention have the advantage that throttle opening detection errors are corrected or compensated for before reference is made to the engine control parameter map. In this manner, correct engine control parameter data such as ignition timing and fuel injection volume is obtained and engine performance is enhanced.

It will be understood that the above described arrangements of apparatus and the method therefrom are merely illustrative of applications of the principles of this invention and many other embodiments and modifications may be made without departing from the spirit and scope of the invention as defined in the claims.

What is claimed is:

1. In a method for providing engine operational control parameters for an engine having a throttle position sensor for sensing the position of a throttle valve of said engine in which throttle position data from said sensor is utilized in determining the engine operation control parameters comprising the steps of: obtaining a throttle position value from a throttle position sensor, determining if said position value is within a predetermined range, and if so, calculating an adjustment value, determining whether said adjusted value is within a predetermined range, and if so, calculating an adjusted throttle position value comprising said throttle position value adjusted by said adjusted value.

2. The method in accordance with claim 1, further including the step of obtaining engine control data from a map based upon said adjusted throttle position value.

3. The method in accordance with claim 2, wherein said engine control data comprises ignition timing data.

4. The method in accordance with claim 2, wherein said engine control data comprises fuel injection volume data.

5. The method in accordance with claim 1, further including the step of storing said adjustment value.

6. The method in accordance with claim 1, further including the step of ending said calculating said adjustment value if said throttle position value is not within said range.

7. The method in accordance with claim 1, further including the step of setting a flag if said adjustment value is within said predetermined range.

8. The method in accordance with claim 1, wherein said step of calculating said adjusted throttle position value comprises subtracting said adjustment value from said throttle position value.

9. An engine control system for controlling the fuel injection volume and timing of an engine having at least one throttle valve for controlling the air intake to at least one variable volume combustion chamber and having a throttle valve position sensor for providing throttle position data comprising: means for determining if an adjustment to the throttle position data should be accomplished; means for providing an adjustment value when prompted by said means for determining if an adjustment to the throttle position data should be accomplished; means for providing adjusted throttle position data based on said adjustment value; and means for determining one or more engine control parameters from said adjusted throttle position data.

10. The engine control system in accordance with claim 9, further including means for reading a throttle position output value from said throttle valve position sensor.

11. The engine control system in accordance with claim 9, wherein said means for providing adjusted throttle position data based on said adjustment value calculates said data by subtracting said adjustment value from a base throttle position value obtained from a throttle valve position sensor.

12. The engine control system in accordance with claim 9, wherein said means for providing an adjustment value adjusts a throttle position value obtained from a throttle valve position sensor.

13. The engine control system in accordance with claim 9, further including means for determining if said adjustment value is within a predetermined tolerance, and if not, determining one or more engine control parameters based upon throttle valve position data obtained directly from a throttle valve position sensor.

\* \* \* \* \*